United States Patent [19]

Bansal et al.

[11] 4,117,831

[45] Oct. 3, 1978

[54] ENERGY COLLECTOR FOR COLLECTING SOLAR ENERGY AND THE LIKE

[75] Inventors: Jag M. Bansal; Anil Kumar, both of Hopkins, Minn.

[73] Assignee: Manju Bansal, Hopkins, Minn.

[21] Appl. No.: 746,547

[22] Filed: Dec. 1, 1976

[51] Int. Cl.² ................................................. F24J 3/02
[52] U.S. Cl. .................................... 126/271; 126/270; 165/170; 165/66
[58] Field of Search ........................ 126/270, 271, 400; 237/1 A; 165/66, 170, 172–175

[56] References Cited

U.S. PATENT DOCUMENTS

| 2,705,948 | 4/1955 | Rostock | 126/271 |
|---|---|---|---|
| 2,907,318 | 10/1959 | Awot | 126/271 |
| 3,981,294 | 9/1976 | Deminet et al. | 126/271 |
| 4,007,729 | 2/1977 | Chao et al. | 126/271 |
| 4,030,477 | 6/1977 | Smith | 126/271 |

Primary Examiner—Kenneth W. Sprague
Assistant Examiner—James C. Yeung
Attorney, Agent, or Firm—Williamson, Bains, Moore & Hansen

[57] ABSTRACT

A solar energy collector connectable with a fluid-circulating system is contained in a plenum within an insulative housing and has a plurality of generally parallel, heat-absorbing conduits extending between intake and outlet manifolds and confronting the sun or other heat source through a transparent window, each conduit being separated from an adjacent conduit by an intervening slot. Positioned below the conduits is a heat-absorbing tank which is connected in fluid-flow relationship with the outlet manifold and also with the circulation system so that a heat-transfer medium may flow continuously between the energy collector and the circulation system. The tank receives radiant energy through the slots and after absorbing some of the radiation reflects the remaining portion upwardly to the conduits to thereby increase radiation intensity on and heat absorption by the conduits. Multiple reflections between tank and conduits further increase energy absorption both by tank and conduit. The conduits may be of round cross section or may have a planar heat-absorbing surface facing the sun and an arcuate, convex surface facing the tank. The tank may be provided with a plurality of arcuate troughs, a trough underlying and paralleling each conduit to both absorb energy and reflect energy toward the overlying conduit. The conduits may be provided with internal air ducts which communicate with the hot-air plenum and permit heat from the hot air to be transferred through the duct walls and to the fluid medium within the conduits.

13 Claims, 12 Drawing Figures

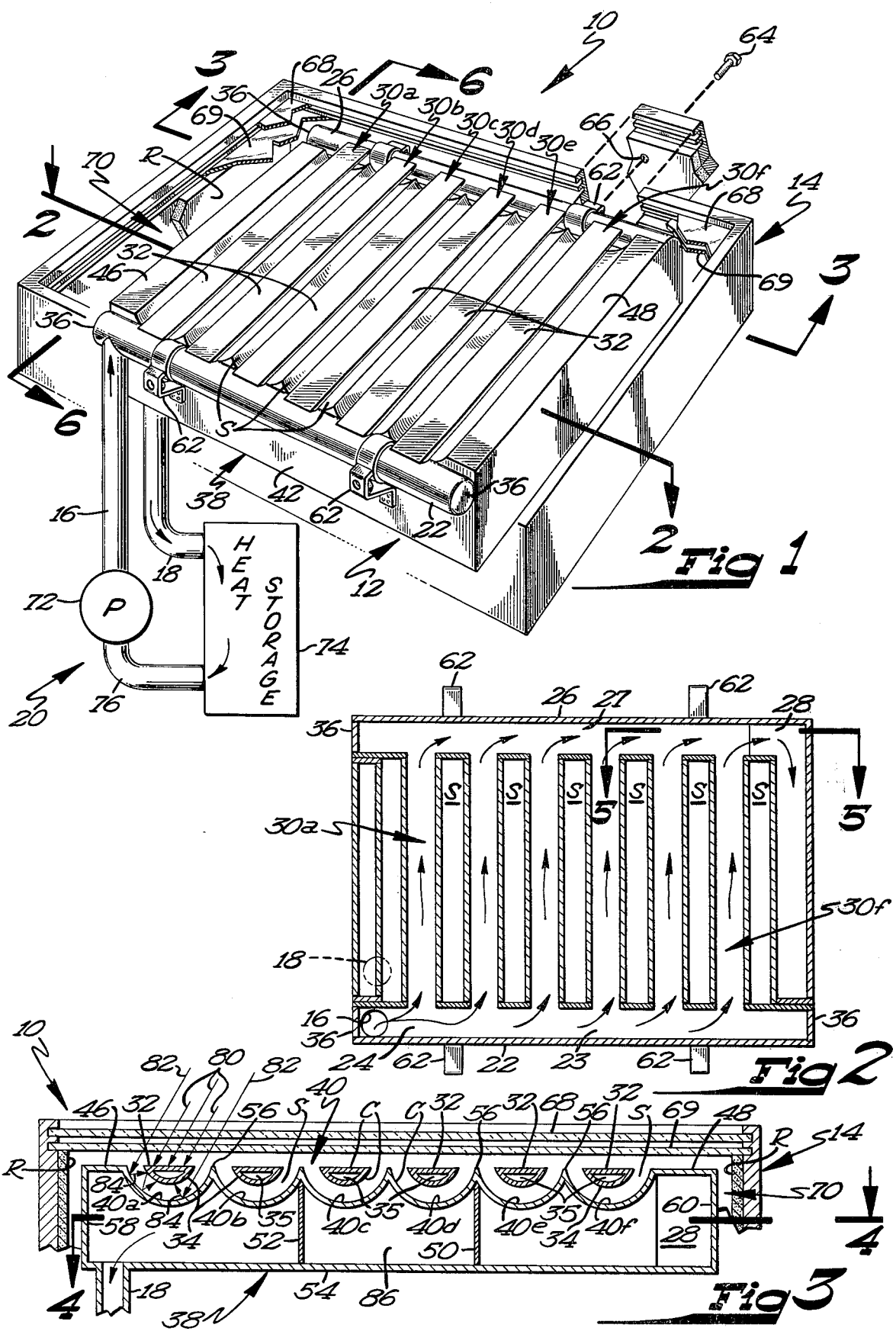

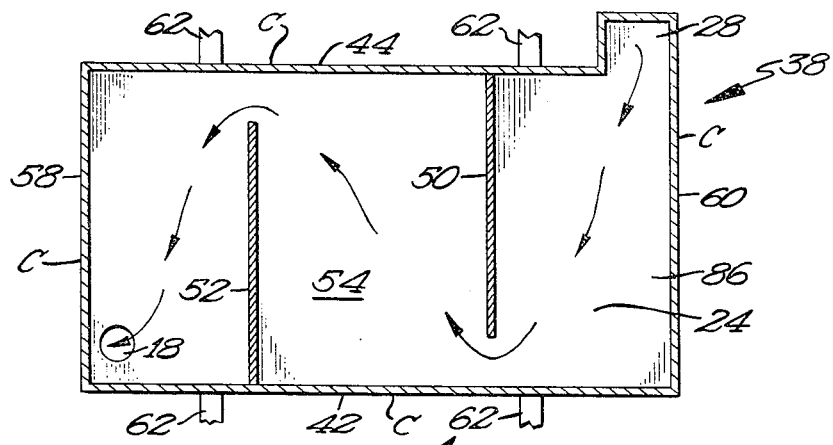
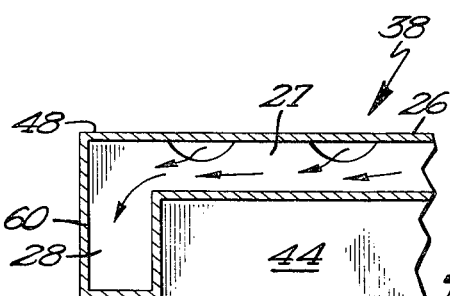
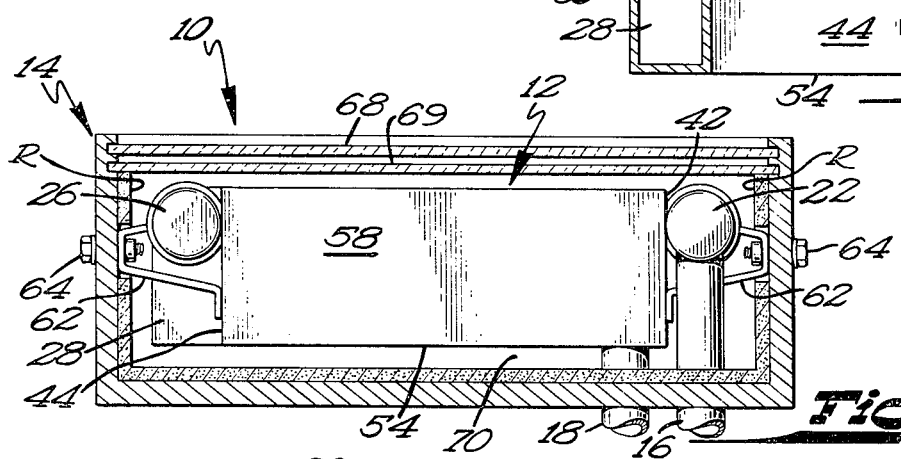
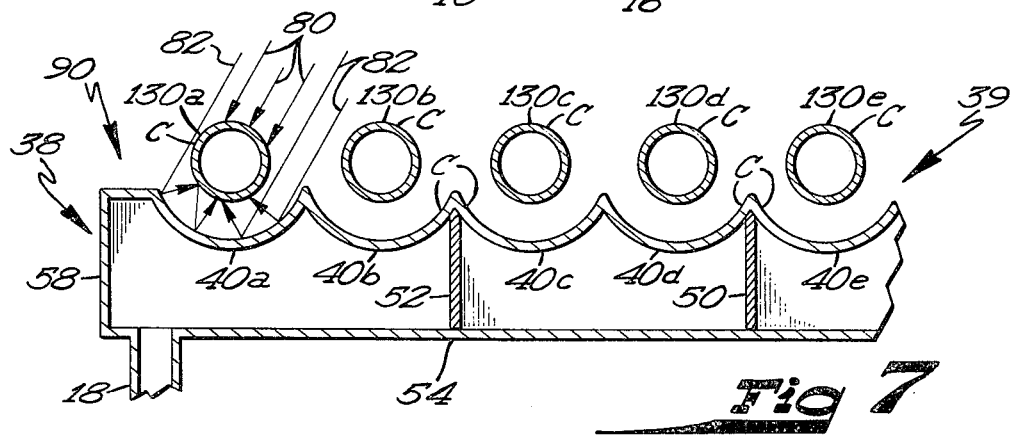

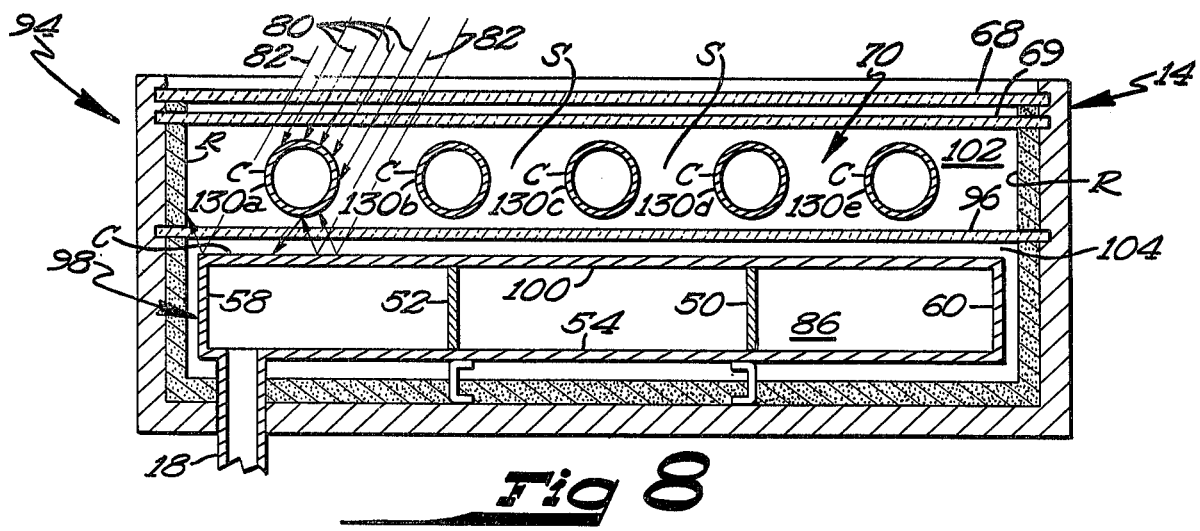
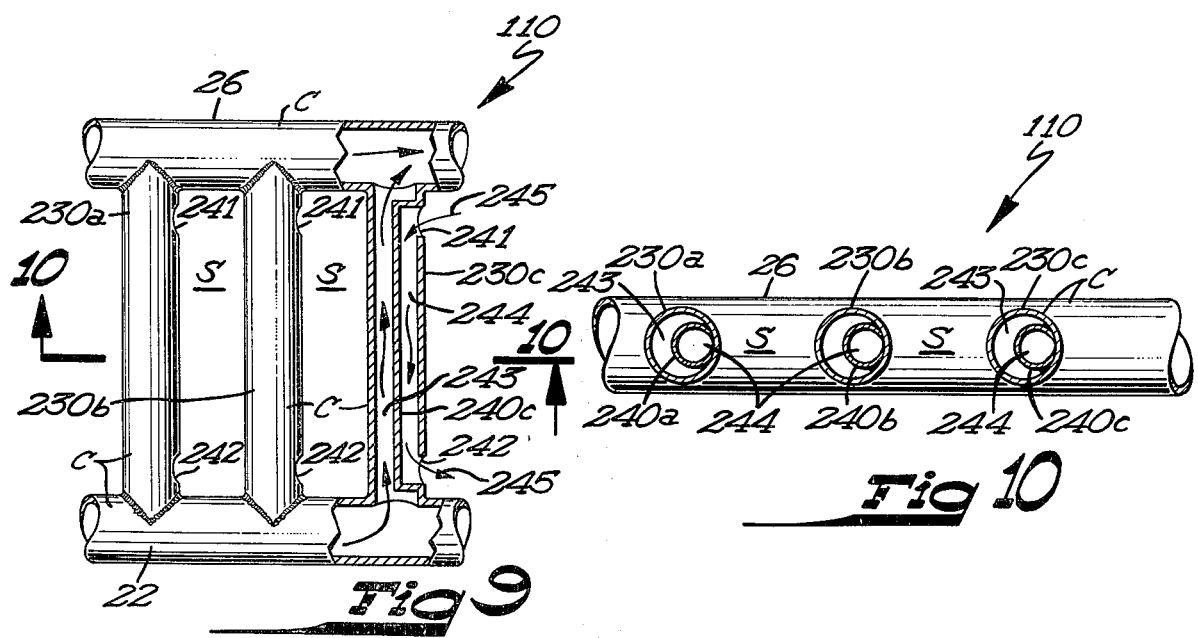
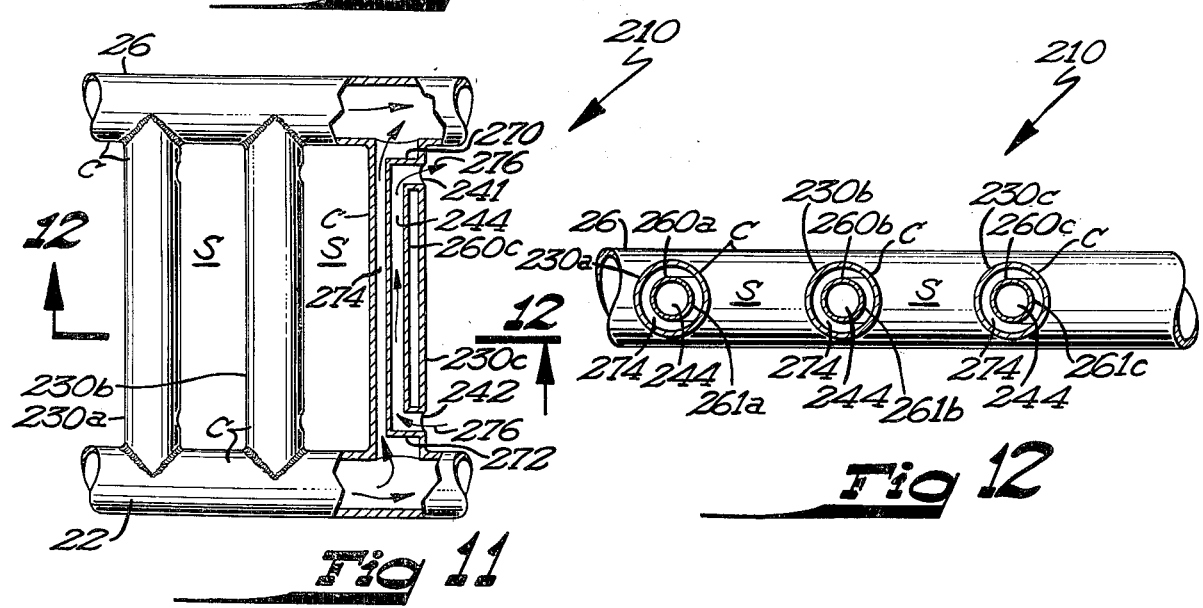

ENERGY COLLECTOR FOR COLLECTING SOLAR ENERGY AND THE LIKE

BACKGROUND OF THE INVENTION

This invention relates generally to the field of energy collectors useful in the accumulation of solar energy or other types of radiant energy and known generally in the art as flat plate collectors.

With the growing realization that the world's supply of fossil fuel is limited and is being steadily depleted, increasing attention has been directed to the field of solar energy and to the development of more efficient and practical solar energy collectors. The known collectors typically utilize an absorber plate supported in an insulated housing and having a window-like heat barrier through which solar radiation or the like freely passes and is directed upon the absorber plate. Typically, after passing through the window, the solar energy is absorbed by the absorber plate and transferred to a fluid heat-transfer medium which may be either liquid or gaseous, the medium then being circulated by any known circulation system to a heat-utilization device such as a space heater, cooler or the like.

The known solar collectors have frequently been inefficient in that a very substantial amount of the solar energy incident upon the absorber plate is reflected and wastefully radiated back to the atmosphere. It is highly desirable that this otherwise lost and reradiated energy be captured and utilized by the collector, and this object is achieved by the invention disclosed herein.

SUMMARY OF THE INVENTION

The invention comprises an improved solar energy collector with first and second stages. The first stage utilizes a plurality of adjacent energy-absorbing conduits separated by elongated slots. The second stage includes a tank positioned below and spaced from the conduits and having a continuous, energy-absorbing face directly beneath the conduits and confronting the energy source through the elongated slots. The ends of the conduits are connected between intake and outlet manifolds, and the outlet manifold connected to the tank. A circulation system is connected between the tank and the intake manifold and contains a fluid heat-transfer medium which is continually circulated and recirculated through the collector, permitting energy absorbed by the collector to be transferred to a heat-utilization or storage device connected in the circulation system.

Preferably, the energy-absorbing conduits are provided with a generally planar energy-absorbing surface confronting the energy source and have an arcuate, generally convex cross section side surface extending downwardly from the planar surface and cooperating with the planar surface to define the conduit. In the preferred form, the energy-absorbing face of the tank is provided with a plurality of generally concave troughs, each of which underlies and partially encompasses an overlying conduit and serves not only to absorb energy from the energy source but also reflects unabsorbed radiation energy upwardly to the overlying conduit. Because the face of the tank serves as both an absorbing surface and a reflecting surface, energy which was previously reflected to the atmosphere through reradiation is now reflected to the overlying conduits and substantial amounts of such otherwise lost energy are captured and utilized. In addition, multiple reflections between conduits and tank can occur and further increments of energy are thus captured.

The solar collector is positioned within the plenum of an insulated housing provided with a transparent window through which radiation is incident on the collector element. Several embodiments of the invention are shown herein, and besides the already described conduit structure the conduits may be of circular cross section and may be provided with an interior duct passing longitudinally along the conduit and through which warmed air from the plenum may circulate and transfer heat through the duct wall to the heat-transfer medium.

A modification of the tank is shown in which the tank surface may be generally planar, and with such modification an additional, generally transparent heat barrier may be positioned between the conduits and the underlying tank to define upper and lower chambers in the plenum. The barrier assures that warmed fluid in the lower chamber is contained in close proximity to the tank to transfer energy to the tank, but does not permit the warm fluid to rise to the upper chamber as would normally occur with simple convection.

Because of the use both of conduits and the underlying tank, the total surface area over which energy absorption occurs is greatly increased over comparable absorption areas for other collectors having the same surface area of transparent, light-receiving window. The invention results in a greatly increased amount of radiant energy being captured which previously was reradiated to the atmosphere.

The invention results in the heat-transfer medium reaching its hottest state as it leaves the tank and enters the circulation system. With the tank positioned below the conduits and distant from the transparent window with a transparent barrier interposed between conduits and tank, the hottest heat-transfer medium in the tank is further isolated from the window of the collector and heat loss reduced. In addition, the warm air adjacent the tank cannot rise to the level of the window with the transparent barrier in its position, and this causes the warmest air to remain below the barrier and adjacent the tank.

Other objects and advantages of the invention will become apparent from the following detailed description and from the appended drawings in which like numbers have been used to describe like parts in the several views.

BRIEF DESCRIPTION OF THE DRAWINGS

FIG. 1 is a front perspective view of an embodiment of the two-stage energy collector taken partially in section and partially in phantom and wherein the circulation system is shown schematically.

FIG. 2 is a top elevation sectional view of the first stage of the collector element of FIG. 1, and is taken in the direction of arrows 2—2 in FIG. 1.

FIG. 3 is a cross-sectional, front elevation view of the collector element of FIG. 1 taken in the direction of arrows 3—3 in FIG. 1.

FIG. 4 is a top elevation, sectional view of a tank used with the collector of FIGS. 1-3 and taken in the direction of arrows 4—4 in FIG. 3.

FIG. 5 is a rear sectional view of a portion of the collector element of FIGS. 1-4 taken in the direction of arrows 5—5 in FIG. 2.

FIG. 6 is an end view of the collector element of FIG. 1 taken in the direction of arrows 6—6.

FIG. 7 is a partial, front sectional view of a collector element similar to that shown in FIG. 1 but embodying a modification of the invention wherein the energy-absorbing conduits are of circular cross section.

FIG. 8 is a front sectional view of another collector element similar to that shown in FIG. 1 but embodying a further modification of the invention wherein the face of the tank is generally planar and wherein a transparent barrier is interposed between conduits and tank.

FIG. 9 is a partial top elevation view of a further embodiment of a collector wherein the conduits are provided with an inner air duct.

FIG. 10 is a front sectional view of the conduits of FIG. 9 taken in the direction of arrows 10—10 of FIG. 9.

FIG. 11 is a partial, top elevation view of still another embodiment of a collector wherein the conduits are provided with inner ducts concentric with the conduits.

FIG. 12 is a front sectional view of the conduits of FIG. 11 taken in the direction of arrows 12—12.

DESCRIPTION OF THE PREFERRED EMBODIMENTS

Referring now to FIGS. 1-3, a first embodiment 10 of a two-stage energy collector has a radiation absorption element 12 mounted within a well-insulated housing 14 and connected by inlet and outlet tubes 16 and 18, respectively, to a fluid circulation system 20.

The absorption element 12 may be of substantially any size and has an intake manifold 22 formed preferably of a metallic or plastic material having a high heat-transfer capability and having closed ends 36. The manifold 22 has a hollow interior 23 along which a heat-transfer medium 24 flows after entering the manifold 22 through inlet tube 16. While it is preferred that the heat-transfer medium be a gas such as air, other known coolants such as water or other known liquid coolants are usable and within the purview of the invention.

An outlet manifold 26 with closed end 36 is positioned opposite and generally parallel to the intake manifold 22 and the manifold 26 is formed of substantially identical material to that of manifold 22 and has a hollow interior 27, along which heat-transfer medium 24 flows to the inlet 28 of an underlying tank 38 which will be described further hereafter.

A plurality of generally parallel, substantially identical conduits 30a–30f extend transversely to the manifolds 22 and 26 and are fixed to the manifolds in fluid-flow relationship therewith to permit flow of heat-transfer medium 24 from the manifold 22 to the manifold 26 without leakage. Preferably the cross-sectional area of each conduit is small compared to that of the manifolds. Each of the conduits 30a–30f are spaced from the adjacent conduit with an intervening slot S therebetween, the slots serving a purpose to be further described hereafter. In view of the conduits 30a–30f being substantially identical, only conduit 30a will be described in detail.

The conduit 30a has a generally flat, planar energy-absorbing side surface 32 which confronts the sun or other radiant energy source and absorbs a substantial amount of radiant energy, the heat from which is transferred through the metallic or plastic highly heat-conductive material from which the conduit is formed to the heat-transfer medium 24 flowing within the conduit. Referring now to FIG. 3, the conduit 30a is provided with a generally arcuate, convex lower side surface 34 which extends outwardly from the planar surface 32 and cooperates therewith to define the conduit and its hollow interior 35. Preferably the surface 34 is of constant radius.

The intake and outlet manifolds 22 and 26, respectively, and the plurality of transverse conduits 30a–30f, along with inlet tube 16, collectively define a first stage of the element 12 and comprise a first radiation-absorbing means which, when arranged in confronting relationship with the energy source, absorbs substantial radiation energy from the source and transfers it to the heat-transfer medium 24 within the element. Preferably the manifolds and the conduits are coated with an outer coating C conducive to the absorption of heat energy. Any material or coating which optimizes heat absorption, such as but not limited to a blackening agent, is within the purview of the invention.

Referring now to FIGS. 1, 3 and 4, the element 12 has a second stage comprising a tank 38 underlying the first stage and connected in fluid-flow relationship with the outlet manifold 26 of the first stage at tank inlet 28. The tank 38 has radiation-absorbing front and rear longitudinal sides 42 and 44, respectively, which extend between radiation-absorbing lateral sides 58 and 60. The bottom of the tank is identified as 54 in FIGS. 3 and 4.

The tank 38 is generally rectangular and has an upper, radiation-absorbing face 39 positioned below and confronting both conduits 30a–30f and the intervening slots S, so that radiation incident on the upper stage passes through the slots S and onto the face 39.

While the face 39 may have any of several different configurations, as will be described further hereafter, it is preferred that the face have a plurality of generally transverse, arcuate, concave troughs 40a–40f, as best shown in FIG. 3, each such trough extending from the front longitudinal side 42 of the tank to the rear longitudinal side 44. Since the troughs are substantially identical, only trough 40a will be described in detail.

The trough 40a is preferably of circular or parabolic cross section and serves as an energy-absorbing surface and also defines a reflector for reflecting the unabsorbed portion of incident radiation toward the adjacent confronted conduit 30a. It has been found useful and desirable to have the cross section of trough 40a be of generally constant radius and concentric with the confronted, preferably constant radius surface 34 of conduit 30a, although concentricity is not essential for satisfactory performance. If desired, the trough 40a may be parabolic in cross section and preferably centered on the adjacent, confronted conduit 30a.

Raised end abutments 46 and 48 of the tank 38 provide lateral strength to the face 39 and also absorb radiation from the heat source.

Referring now to FIG. 4, the tank 38 is provided with at least two upright interior baffle plates 50 and 52 which direct incoming flow in a predetermined, zigzagging path from entry 28 around baffle plate 50 and thence around baffle plate 52 and finally to outlet tube 18, as shown by the flow arrows, assuring an even, gradual flow through the tank and high absorption of heat energy from the face 39 by the flowing heat-transfer medium 24. The baffle plates 50 and 52 extend between face 39 and tank base 54, but extend only partially between the front and rear walls 42 and 44.

The tank 38 has the uppermost portions 56 of its face 39 extending upwardly to a level approximately level with the planar side surface 32 of the conduits, and preferably lying approximately midway between the lateral edges of adjacent conduits to permit the troughs to receive radiation through the slots S and either absorb such radiation or reflect it toward the conduits 30a–30f. Preferably the entire face 39, including the abutments 46 and 48, are coated with an energy-absorbing material C like that already described, so as to optimize absorption of radiation from the energy source. Sides 42, 44, 58 and 60 are also provided with the coating C to increase absorption.

The front and rear longitudinal walls 42 and 44 of the tank are appropriately spaced from one another so as to be wholly confined between the intake and outlet manifolds 22 and 26. The tank inlet 28 extends outwardly from the wall 44 and communicates with the outlet manifold 26 to permit heat-transfer medium to flow from the outlet manifold 26 of the first stage to the tank 38.

Tank 38 with its described energy-absorbing face 39 defines a second stage of the element 12 and comprises a second radiation-absorbing means positioned below and confronting the already described first radiation-absorbing means so as to permit solar radiation passing through the slots to strike the face 39 and be partially absorbed and partially reflected toward the already described conduits 30a–30f.

Attachment brackets 62 are fixed to and extend outwardly from the element 12 and assist in interconnecting the first and second stages, as well as permitting the element 12 as a whole to be supported by and attached to the insulative housing 14 by means of bolts or screws 64 passed through bores 66.

Referring now to FIG. 1, the insulative housing 14 comprises an insulated box-like structure wholly enclosing the element 12 and utilizing any appropriate, known insulation materials to retain heat within the housing 14. The top of the housing, which confronts the sun or other energy source, has transparent window means defined by one or more layers of transparent glass or plastic such as transparent spaced-apart sheets 68 and 69, through which radiation passes on its way to the element 12. The inlet and outlet tubes 16 and 18, respectively, pass through the insulative housing 14 and attach to the circulation system 20 to be described hereafter. The insulative housing 14 completely encloses the element 12 and defines a plenum 70 in which air or any other appropriate plenum fluid including liquids or gases surrounds the element 12 and is continuously heated by incident radiation. If desired, the plenum may be evacuated and a substantial vacuum maintained therein for further insulation. The interior surface of housing 14 has a reflective coating R.

The circulation system 20 may be any known fluid circulation system usable with a solar collector and typically includes a pump 72 for moving the heat-transfer fluid through the element 12, thence to a heat-storage or utilization device 74 and then back to the pump 72. Typically the system may contain more than one heat-storage or utilization device and may be provided with automatic control means such as a thermostat or other device known to the art in order to meet specific heat energy requirements.

In operation, the first embodiment 10 is mounted in a position confronting the sun or other energy source from which radiation 80 and 82 is to be received. Referring now to FIG. 3, the heat radiation 80 from the energy source passes through the transparent sheets 68 and 69 and strikes the planar, energy-absorbing surface 32 of each of the conduits 30a–30f. The blackened or energy-absorbing coating C on each of the surfaces 32 assures that a substantial amount of radiant energy 80 is absorbed by the side surface 32.

Simultaneously, solar radiation indicated by arrows 82 similarly passes through the insulating glass layers 68 and 69 and, passing through the slots S, strikes troughs 40a–40f and as shown at arrows 84 is reflected toward the arcuate side surfaces 34 of the conduits. It should be understood that while the radiation 82 is shown as being reflected, a substantial amount of energy from the radiation 82 is absorbed by the troughs 40a–40f and only the remaining portion is reflected toward the overlying and confronted conduits. Such reflection between adjacent troughs and conduits may occur two or more times, depending upon the angle of incidence. During each of such reflections, the troughs and conduits absorb heat energy from the radiation and transfer the energy to the heat-transfer medium 24 flowing within the conduits and within the tank interior 86.

Accordingly, heat-transfer medium 24 flows from the pump 72 and along inlet tube 16 to enter intake manifold 22 from which it flows through the individual conduits 30a–30f toward exhaust manifold 26, as shown by flow arrows in FIG. 2. As the coolant flows through the manifolds and conduits, solar radiation incident on the manifolds and conduits is absorbed and transferred to the fluid to steadily warm the fluid as it passes through this first heating stage. The fluid leaves the outlet manifold 26 through tank inlet 28 and drops downwardly into the tank interior 86. Referring now to FIG. 4, the fluid flows from the tank inlet 28 along the zigzag path shown by flow arrows in FIG. 4 and across the tank, flowing around the baffle plate 50 and then moving toward the rear wall 44 to flow around the baffle plate 52, finally reaching outlet tube 18. As the fluid flows through the tank interior 86, heat energy is transferred to the fluid 24 from the face 39 and the many troughs therealong, and the fluid grows steadily hotter.

It should particularly be noted that the initial heating of the fluid occurs in the conduits and manifolds and that further heating occurs in the tank 38 which is positioned more distantly from the transparent sheets 68 and 69. As a result, the warmest part of the element, namely the tank, is farther from the principal heat loss area at sheets 68 and 69. Because of the distance between the transparent sheets and the tank, the amount of heat loss from the tank through the transparent sheets is reduced. The portions of the element in close proximity to the panels, viz. the manifolds 22 and 26 and the conduits, are at a lower temperature than the tank 38 and accordingly do not lose as much heat through the sheets 68 and 69.

While a specific number of conduits and troughs has been shown in conjunction with embodiment 10, it should be understood that a greater or lesser number of such structures may be used with the element as required by the specific heating application for which the collector will be used, and the specific number of troughs and conduits shown in the drawings is merely illustrative of one form of the invention.

As the embodiment 10 is exposed to solar radiation, the plenum 70 of the insulative housing 14 grows steadily warmer and heat contained in the air within the plenum may also be transferred to the element 12 and absorbed by the fluid 24 within. The insulation 88 of the housing reduces the heat loss from the housing and keeps the warmed air in close proximity to the element 12, which is supported within the housing 14 by means of the brackets 62. Accordingly, the heated air in the plenum 70 may circulate about all sides of the element 12 to further transfer heat energy to the fluid within the element.

The heated fluid leaves the tank 38 through outlet tube 18 and flows to a heat-storage device 74, which may be any type of storage or utilization device known to the art. After storage or utilization of heat contained in the fluid 24, the fluid leaves the storage device 74 and flows along pipe 76 to the pump 72 and is repeatedly recirculated through the element 12 and circulation system 20. Accordingly, the pump, pipe 76, outlet tube 18, and heat-storage device 74 comprise a circulation system usable with the collector 10 and which permits the continual circulation and recirculation of fluid through the element for repeated heating.

Referring now to FIG. 7, another embodiment 90 of a collector element has a tank 38 similar to that shown in FIGS. 1-3 and a plurality of conduits 130a-130e wherein the conduits are of circular cross section. Aside from the conduits being of circular cross section, the embodiment 90 is identical in construction and operation to that embodiment 10 of FIGS. 1-5. Preferably, the troughs 40a-40e of FIG. 7 are of parabolic or alternatively are of constant radius and centered on the adjacent overlying conduit and partially encompass the conduit.

In operation, the element 90 is positioned in an insulative housing 14 and connected to a circulation system 20. Radiation entering the housing 14 strikes either the conduits 130a-130e or, alternatively, the underlying troughs 40a-40e. Radiation 80 striking the conduits is absorbed in whole or part and transferred to the fluid 24 within the conduits. The element 90 has its energy-absorbing, external surfaces covered with a heat-absorbing coating C which aids heat absorption. Radiation 82 bypassing the conduits and passing through slots S strikes the troughs 40a-40e and some energy is immediately absorbed by the troughs and transferred to the heat-transfer medium 24 within the tank 38, while some reflected radiation is directed from the troughs toward the conduits and absorbed by the conduits. Multiple reflections can occur in the embodiment 90 and all radiation energy absorbed by the conduits or the troughs is transferred to the heat-transfer medium 24 flowing within, and in other respects the operation of embodiment 90 is identical to that of embodiment 10 described earlier.

Referring now to FIG. 8, a third embodiment 94 of the energy collector is shown, wherein circular cross-section conduits 130a-130e identical to those described in conjunction with embodiment 90 of FIG. 7 are shown. It should be understood, however, that in the embodiment 94 conduits having a cross-sectional configuration like those of conduits 30a-30f of FIGS. 1-5 could be substituted. In embodiment 94, a transparent sheet 96 of plastic, glass or like material is interposed between tank 98 and the first radiation-absorbing means comprised of the conduits 130a-130e and intake and outlet manifolds 22 and 26, respectively.

The tank 98 is similar to tank 38 shown earlier, except that the upper energy-absorbing face 100 is planar rather than being provided with troughs. Preferably, the conduits 130a-130e and the energy-absorbing face 100 are provided with an energy-absorbing coating C, as described in the earlier embodiments.

The transparent sheet 96 is interposed between the first and second stages of the element, as shown in FIG. 8, and extends entirely across the housing 14 with the inlet tube 16 and the tank inlet 28 passing through the sheet or diverted about it, the object being to have the sheet 96 subdivide the plenum 70 into upper and lower, separate and distinct air chambers 102 and 104.

As explained in conjunction with the earlier embodiments, the fluid reaches its highest temperature as it leaves the tank 38 or 98, and accordingly the fluid in the second stage is substantially hotter than that in the first stage. Accordingly it is desirable to utilize the sheet 96 as a transparent heat barrier to divide the plenum 70 into a lower chamber 104 containing the warmer second stage and to isolate the second stage from the cooler first stage located in chamber 102. The warmer second stage tends to heat the air about it, and by interposing the sheet 96 between first and second stages, the heated air in the lower chamber 104 is contained in close proximity to the second stage and is prevented from rising to the first stage area and concentrating immediately under and against the window means 69. If the warmest air from the second stage were to become concentrated against the window 69, heat loss through the window would be substantially increased. By keeping the warmest air isolated from the window 69, such heat loss can be substantially reduced.

While the use of a transparent sheet 96 has been shown only in conjunction with the embodiment 94, it should be understood that it can be as readily utilized with the embodiments 90 or 10 by simply spacing the first stage sufficiently from the second stage to permit the sheet 96 to be interposed therebetween. Accordingly, it is within the purview of the invention that the transparent sheet 96 is usable between the conduits and tank of any embodiment of the invention disclosed herein.

The operation of the embodiment 94 is similar to that of the embodiments 10 and 90. Radiation entering the housing 14 and incident on the conduits 130a-130e is substantially absorbed, as described in conjunction with the embodiment 90. Radiation by passing the conduits through the intervening slots S passes through the transparent sheet 96 and strikes the face 100 of tank 98. A substantial amount of the incident radiation is absorbed by face 100 and transferred to the heat-transfer medium within tank 98. Much radiation is reflected from the face 100 toward the conduits and is absorbed by conduits 130a-130e, thereby further heating the fluid within the conduits. The intervening sheet 96 keeps warmer air concentrated around the tank 98, thereby assuring increased heat transfer from the tank to the fluid within. In other respects, operation of embodiment 94 is identical to that of embodiment 10, and will not be discussed further.

Referring now to FIGS. 9 and 10, a further embodiment 110 of the first stage of the energy collector element is shown. The embodiment 110 utilizes intake manifold 22 and outlet manifold 26, which are substantially identical to the manifolds shown in FIGS. 1-6. Extending between manifolds 22 and 26 are energy-absorbing, generally circular cross-section conduits 230a, 230b and 230c, which are separated from one another by intervening slots S and carry the energy-absorbing coating C. While only three conduits have been shown in FIGS. 9 and 10, it should be understood that a greater or lesser number of conduits may be used and is within the purview of the invention, and that the shown conduits and intake and outlet manifolds of FIGS. 9 and 10 may be substituted for the first stage of the element shown in FIGS. 1, 7 or 8.

Referring again to FIGS. 9 and 10, each conduit 230a–230c has a duct 240a, 240b and 240c respectively, positioned interiorly of the conduit and extending generally parallel to the conduit in which contained and communicating with the plenum chamber 70 through orifices 241 and 242.

Accordingly, flow of heat-transfer medium passes from intake manifold 22 and flows along channels 243 of the conduits, while plenum fluid heated from within the plenum 70 is free to circulate by natural convection through the interiors 244 of the ducts, as indicated by flow arrows 245. This arrangement results in substantially greater heat-transfer area over which the heat-transfer medium flows as it moves along channel 243 and thus more heat is transferred to the medium.

Aside from the fact that heated plenum fluid is free to circulate by convection through the ducts 240a–240c and thereby transfer heat to the channel 243 by conduction, operation of the embodiment 110 is identical to that described in conjunction with embodiment 90 or 94, and any of the disclosed tanks may be used in conjunction with the embodiment 110.

Referring now to FIGS. 11 and 12, a further embodiment 210 discloses an alternative structure for the first stage of the collector element in which the conduits 230a, 230b and 230c are provided with circulating ducts 260a, 260b and 260c which are of circular cross section and which have a longitudinal segment 261a, 261b and 261c substantially concentric with the circular cross section conduits 230a, 230b and 230c respectively. In each of the ducts 260a–260c, the longitudinal segment is concentric with the adjacent conduit, and transverse end segments 270 and 272 extend to and pass through the sidewall of the conduit, communicating through orifices 241 and 242 with the warm plenum fluid in the plenum chamber 70. Preferably the manifolds 22 and 26, along with the conduits 230a–230c, are provided with the energy-absorbing coating C.

Accordingly, heat-transfer medium flows from the intake manifold 22 and along generally annular channel 274 of each conduit into outlet manifold 26 and then continues its flow, as described in conjunction with the embodiments 10, 90 and 94. Warm plenum fluid within the plenum is free to circulate through the orifices and along the interior 244 of ducts 260a–260c, therby transferring heat to the ducts and thence to the heat-transfer medium surrounding the air ducts and flowing along the annular channel 274. Thus the interior ducts 260a–260c substantially increase the heat-transfer area of the conduit and assure that fluid flowing along channel 274 acquires additional energy in passing therethrough.

It should be understood that embodiment 210 may have a greater or lesser number of conduits 230a–230c depending upon the application for which the structure will be used. It should be further understood that the embodiment 210 may be interchanged and used in place of the embodiment 110 or in place of the conduits 30a–30f of FIGS. 1–6 or in place of the conduits shown in FIGS. 7 and 8.

Accordingly, the embodiments 110 and 210 shown in FIGS. 9 through 12 not only acquire heat from solar radiation incident on the conduits and manifolds and from reflected energy from the underlying tank, but also acquire heat energy from the heated plenum fluid within the plenum and contacting the interior of the ducts, thereby providing a highly efficient and reliable energy collector.

With all embodiments shown herein, it should be understood that radiation passing through the slots S and striking the underlying tank face will be partially absorbed by the tank face and partially reflected toward the overlying conduits. Not infrequently this reflected radiation will be re-reflected by the conduits back to the tank face after absorption of a further portion of energy by the conduits. Additional reflections between tank face and conduits also occur and thereby permit further capture of radiant energy. All such multiple reflection activity is within the purview of the invention.

With all of the embodiments shown herein, it should also be understood that the plenum may be provided with a plenum fluid which may be either gaseous or liquid, air being satisfactory in many instances. The purpose of such a plenum fluid is to both provide some insulation between the walls of the housing and the element and also to transfer heat absorbed by the plenum fluid to the element by conduction. With the embodiments shown in FIGS. 9–12 the warm plenum fluid flows by convection through the described ducts but actually primarily transfers heat to the element by conduction. If desired, the plenum may be evacuated and a partial vacuum established therein to maximize the isolation of the element from the housing 14.

While the preferred embodiments of the present invention have been described, it should be understood that various changes, adaptations and modifications may be made therein without departing from the spirit of the invention and the scope of the appended claims.

What is claimed is:

1. An energy collector for collecting radiant energy from an energy source and usable with a circulation system having a fluid heat-transfer medium, the collector comprising:

first radiation-absorbing means connectable with the circulation system, said first radiation-absorbing means including a plurality of radiation-absorbing, hollow-interior conduits confronting the energy source and separated from each other by slots, each said conduit capable of channeling the heat-transfer medium therethrough, said conduits capable of absorbing radiation energy from the energy source and conducting such energy to heat-transfer medium within said hollow interior;

second radiation-absorbing means connected to said first radiation-absorbing means to permit flow of heat-transfer medium therebetween and connectable to the circulation system to permit heat-transfer medium flow within said second absorbing means and between said second absorbing means and the circulation system, said second absorbing means having a face which extends below said conduits and confronts said conduits from below, confronts said slots and also confronts the energy source through said slots, said face extending uninterruptedly adjacent said slots and conduits to receive and absorb most radiant energy passing through said slots and incident on said face so as to conduct the energy to the heat-transfer medium, and also to define a reflector for reflecting radiant energy which is not absorbed by said second means toward said first absorbing means, thereby increasing radiation intensity and absorption by said first absorbing means; and an insulative housing adjacent said first and second radiation absorbing means and defining a plenum about said first and second absorbing means to contain plenum fluid in said plenum and to decrease energy loss from said first and second absorbing means, said housing including window means through which radiation energy may be incident on said first and second radiation-absorbing means.

2. The energy collector of claim 1 wherein each said conduit includes a generally planar energy-absorbing side surface substantially confronting the energy source and further includes a generally convex arcuate side surface extending from said planar surface and facing downwardly toward said second radiation-absorbing means to encourage multiple reflection of unabsorbed energy between said first and said second absorbing means to increase capture of radiant energy.

3. The energy collector of claim 2 wherein said planar and arcuate side surfaces extend substantially the full length of each said conduit.

4. The energy collector of claim 2 wherein said face of said second radiation-absorbing means includes a plurality of concave, arcuate troughs with a said trough confronting and underlying each said conduit to receive radiant energy through said slots between said conduits and absorb a portion of such energy and also to reflect a portion of such unabsorbed energy toward the confronted conduit to thereby increase capture of radiant energy by said confronted conduit.

5. The energy collector of claim 4 wherein said second radiation-absorbing means includes a tank through which heat-transfer medium is circulatable, said tank directly underlying said conduits and having one wall defined by said plurality of arcuate troughs.

6. The energy collector of claim 1 wherein said second radiation-absorbing means includes a tank through which heat-transfer medium is circulatable, said tank directly underlying said conduits and having one wall defined by said face.

7. The energy collector of claim 1 wherein said conduits are of substantially circular cross section, and said face includes a plurality of generally concave, arcuate troughs, the cross section of each said trough being of substantially constant radius and each said trough being substantially concentric with a said conduit and partially encompassing the conduit with which the trough is concentric.

8. The energy collector of claim 1 wherein said face is a planar surface spaced from said conduits.

9. The energy collector of claim 1 and further including a transparent heat barrier between said first and said second radiation-absorbing means, said barrier being carried by said insulative housing to subdivide said plenum into upper and lower chambers and to contain heated plenum fluid in the lower chamber in close proximity to said second radiation-absorbing means and thereby prevent heated plenum fluid in said lower chamber from rising to said upper chamber.

10. The energy collector of claim 1 and further including a plurality of ducts, a duct being positioned within each said conduit and being fluidically isolated from the heat transfer medium circulatable through said conduit, each said duct passing along the said conduit and communicating with said plenum to permit flow of heated plenum fluid from said plenum along said duct, each said duct thus increasing the effective surface area to which heat transfer medium is exposable and permitting heated plenum fluid to flow through the ducts by convection and transfer additional heat through the ducts to said medium.

11. The energy collector of claim 10 wherein each of said conduits and ducts is circular in cross section and each said duct has an elongated segment concentric with a said conduit, each said duct having a pair of end segments communicating with said elongated segment and extending transversely to the elongated segment, transversely to said conduit and communicating with said plenum to permit heated plenum fluid in said plenum to flow through said ducts by convection.

12. The energy collector of claim 1 wherein said insulative housing has a reflective surface on the interior walls to reflect radiant energy which falls on the interior walls towards said first and second radiation-absorbing means.

13. In combination with a circulation system having a pump and a fluid heat-transfer medium within said circulation system, an improved energy collector for collecting radiant energy from an energy source, comprising:

first radiation-absorbing means connected with said circulation system, said first radiation-absorbing means including a plurality of radiation-absorbing, hollow-interior conduits confronting the energy source and separated from each other by slots, each said conduit channeling said heat-transfer medium therethrough, said conduits capable of absorbing radiation energy from the energy source and conducting such energy to such heat-transfer medium within said hollow interior;

second radiation-absorbing means connected to said first radiation-absorbing means to permit flow of said heat-transfer medium therebetween and connected to said circulation system to permit heat-transfer medium flow between said second absorbing means and said circulation system in response to operation of said pump, said second absorbing means having a face which extends below said conduits and confronts said conduits from below, confronts said slots and also confronts the energy source through said slots, said face extending continuously below said slots to receive and absorb radiant energy passing through said slots and incident on said face so as to conduct the energy to said heat-transfer medium, and also to define a reflector for reflecting radiant energy which is not absorbed by said second radiation-absorbing means, toward said first radiation-absorbing means, thereby increasing radiation intensity on and absorption by said first radiation-absorbing means; and an insulative housing adjacent said first and second radiation-absorbing means to decrease energy loss from said first and second radiation-absorbing means, said housing including window means through which radiation energy may be incident on said first and second radiation absorbing means.

* * * * *